May 22, 1956

R. F. GAMUNDI 2,746,805

WHEEL COVERS

Filed March 19, 1952

INVENTOR.
REYNOLD F. GAMUNDI
BY Hudson, Boughton,
Williams, David & Hoffmann.
ATTORNEYS May 22, 1956   R. F. GAMUNDI   2,746,805
WHEEL COVERS
Filed March 19, 1952   3 Sheets-Sheet 2
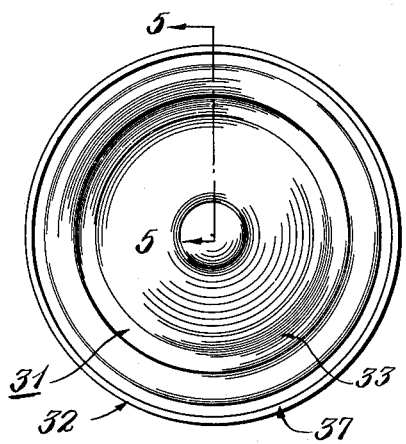
Fig. 4
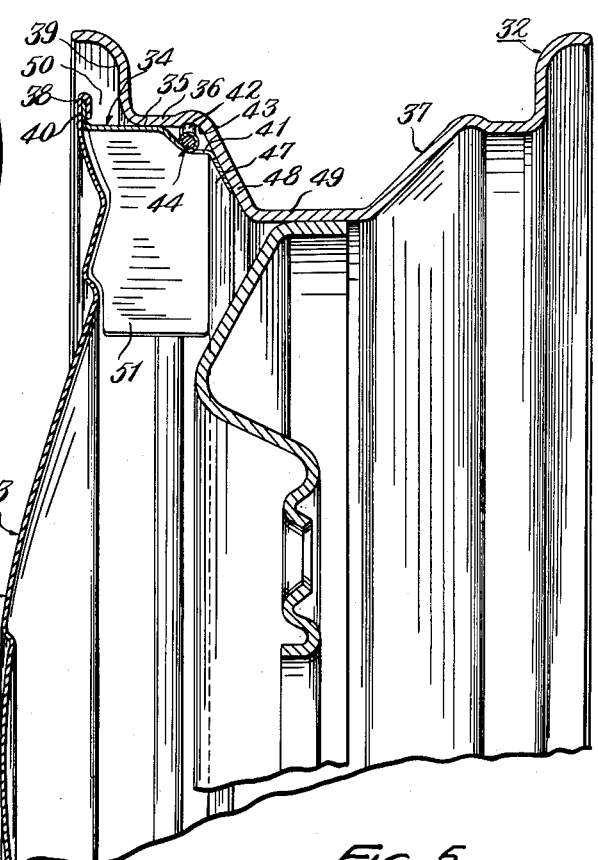
Fig. 5
Fig. 7
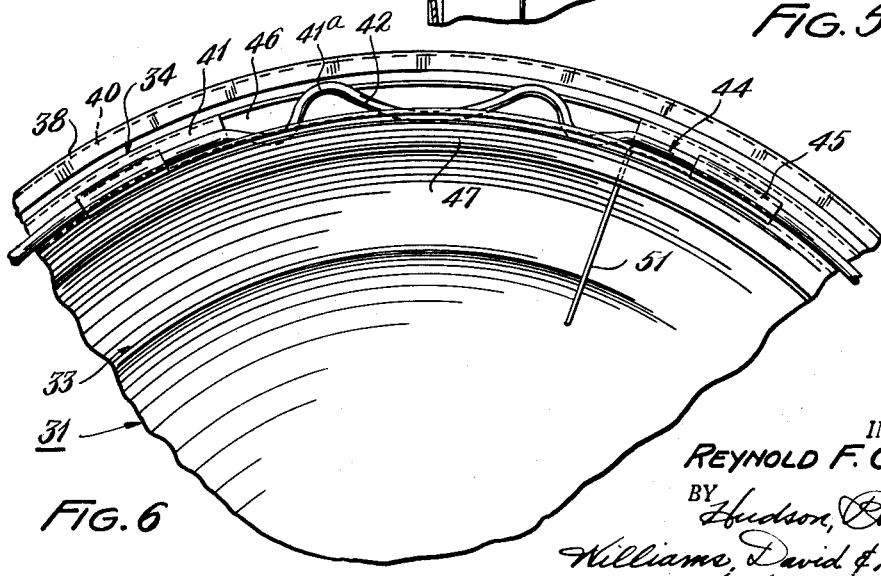
Fig. 6
INVENTOR.
REYNOLD F. GAMUNDI
BY Hudson, Boughton,
Williams, David & Hoffmann
ATTORNEYS May 22, 1956  R. F. GAMUNDI  2,746,805
WHEEL COVERS Filed March 19, 1952  3 Sheets-Sheet 3

INVENTOR.
REYNOLD F. GAMUNDI
BY Hudson, Boughton,
Williams, David & Hoffmann
ATTORNEYS United States Patent Office 2,746,805
Patented May 22, 1956

2,746,805

WHEEL COVERS

Reynold F. Gamundi, Mayfield Heights, Ohio, assignor to Eaton Manufacturing Company, Cleveland, Ohio, a corporation of Ohio Application March 19, 1952, Serial No. 277,467

16 Claims. (Cl. 301—37)

This invention relates to wheel covers and, more particularly, to a wheel cover of the type adapted to be detachably applied to a vehicle wheel and which, in its applied position extends over the front or outer side of the wheel and constitutes both a protective shield and an ornamental trim device.

An object of the present invention is to provide an improved and simplified construction for such a wheel cover comprising a minimum number of connected parts, and in which one of the connected parts is a wire ring carrying spaced retaining elements for releasable holding engagement with the vehicle wheel.

Another object is to provide a wheel cover of this character which includes a generally axially extending rear annular flange of a diameter for telescoping cooperation with the rim member of the vehicle wheel, and in which the retaining elements of the wire ring project substantially radially from such annular flange.

A further object is to provide an improved wheel cover of the character mentioned above in which the annular flange has circumferentially spaced openings therein spanned by resiliently flexible portions of the wire ring, and in which the retaining elements are located at the respective openings and are movable substantially radially of the cover by flexing of such spanning portions of the wire ring.

Still another object is to provide a wheel cover, of the kind just above referred to, in which the retaining elements are defined by bent portions of the wire ring.

It is also an object of this invention to provide an improved wheel cover having a generally axially extending rear annular flange carrying a plurality of retaining elements for holding engagement with a vehicle wheel and in which such flange also carries a series of annularly spaced cooling fins formed by metal deflected form said flange.

Yet another object is to provide an improved wheel cover construction in which seat means carried by the axially extending rear annular flange is engageable with a portion of the rim member of the vehicle wheel, such as the drop-center portion, for holding the peripheral rim portion of the cover spaced from the wheel to define therebetween an air passage when the cover has been applied to the wheel, and in which the cooling fins carried by the annular flange are disposed adjacent such air passage.

Another object is to provide an improved wheel cover of the kind referred to above in which generally radially projecting retaining elements are formed by bent portions of a wire ring mounted on the rear annular flange and in which the retaining elements are inclined forwardly from their point of connection with said flange.

As a further object, this invention provides a wheel cover having an axially rearwardly extending annular flange carrying retaining means engageable with the vehicle wheel and in which prong means also carried by said flange cooperates with the wheel for preventing relative rotation between the cover and wheel.

Additionally, this invention provides a wheel cover of the character just mentioned in which the retaining means comprises resilient elements formed by bent portions of a wire ring mounted on said flange and said prong means comprises deflected end portions of the wire ring.

Other objects and advantages of this invention will be apparent in the following detailed description and in the accompanying sheets of drawings in which:

Fig. 4 is a front elevation similar to Fig. 1, but showing a modified form of the improved wheel cover;

Fig. 5 is a partial vertical section on a larger scale taken through the modified cover and the vehicle wheel substantially as indicated by section line 5—5 of Fig. 4;

Fig. 6 is a partial rear elevation of the wheel cover of Fig. 5, but showing the same in detached relation;

Fig. 7 is an enlarged fragmentary view corresponding with a portion of Fig. 5 and further illustrating a detail of construction;

Figure 1:
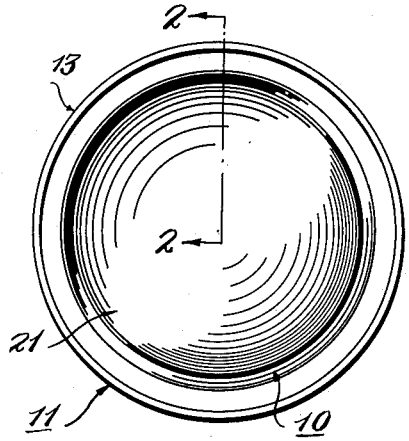
Fig. 1 is a front elevation showing one form of the improved wheel cover applied to a vehicle wheel.
Figure 2:
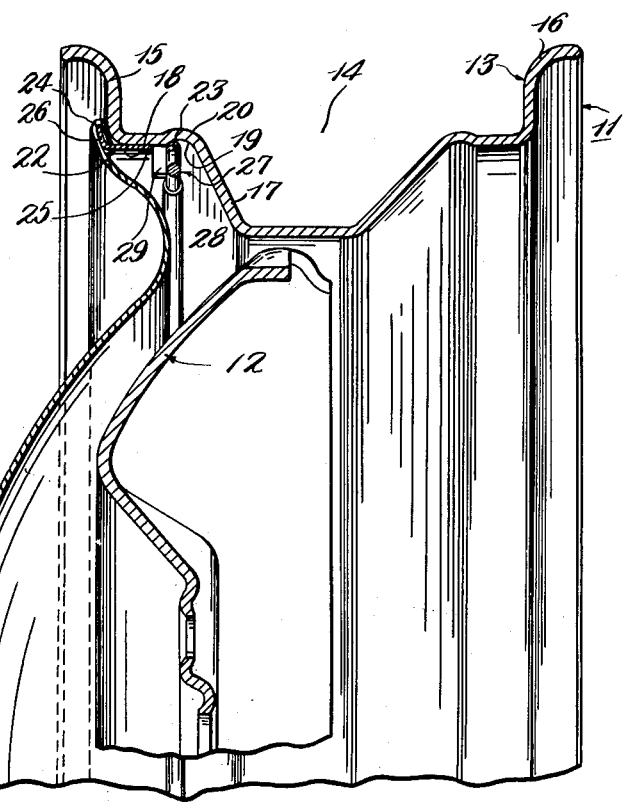
Fig. 2 is a partial vertical section on a larger scale taken through the cover and wheel of Fig. 1 substantially as indicated by section line 2—2.
Figure 3:
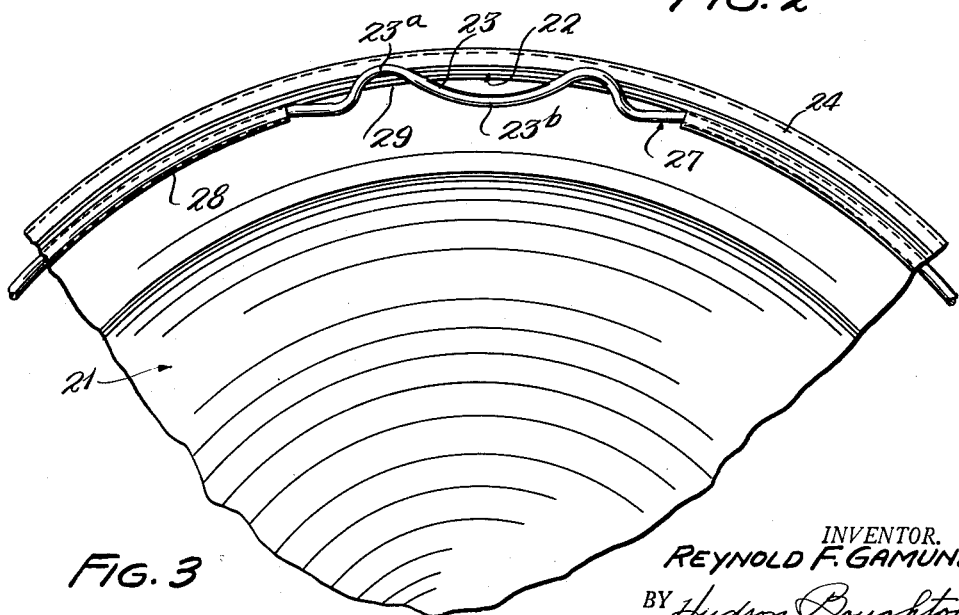
Fig. 3 is a partial rear elevation of the wheel cover showing the same detached from the vehicle wheel.

As representing one practical embodiment of the present invention, Figs. 1 to 3 inclusive show a wheel cover 10 intended for use on a vehicle wheel 11 and adapted to be detachably connected therewith. In its applied position, the cover 10 is located on the front or outer side of the wheel 11 and extends over substantially the entire front of the wheel.

The wheel 11 is a conventional vehicle wheel of the kind used on motor vehicles and adapted to be equipped with pneumatic tires. The wheel is here shown as comprising a bulged-disk body member 12 and an annular rim member 13 connected with and extending around such body member.

The rim member 13 defines an outwardly-opening channel recess 14 extending annularly between a pair of front and rear radial flanges 15 and 16. The rim member 13 also comprises an annularly extending drop-center portion 17 forming the bottom of the channel 14, and an inwardly offset portion forming a seat for the front annular bead of the pneumatic tire and defining an annularly extending substantially radial projection or hump 18 internally of the rim member. The annular connecting portion 20 forming the junction between the annular projection 18 and the drop-center portion 17, defines a transversely concave internal annular recess 19 which is located axially inwardly of and immediately adjacent to the annular projection 18.

The wheel cover 10 comprises, in general, an outwardly dished substantially circular sheet metal disk member 21 and a ring member 22 connected with the disk member and carrying circumferentially spaced retaining elements 23 for holding engagement with the rim member 13 when the cover is applied to the wheel 11.

The disk member 21 can be formed by any conventional stamping or spinning operations and may have any desired ornamental configuration or contour. In this instance, the disk member 21 is shown as having a forwardly dished central portion 21$^a$ located opposite the body member 12 of the vehicle wheel and is also provided with an annular outer marginal rim portion defined by a hollow annular peripheral bead 24. The disk member 21 is of a size to extend over substantially the entire front of the wheel 11, such that the peripheral bead 24 will lie in front of and engage the front radial flange 15 of the rim member 13 when the cover is applied to the wheel, as shown in Fig. 2.

The ring member 22 comprises an annular sheet metal member defining a generally axially extending flange 25 on the rear side of the cover. The flange 25 is of a diameter to permit axial telescoping movement thereof into the rim member 13 within the internal annular projection 18 of the latter and preferably has guiding and supporting engagement with this projection. The ring member 22 is also provided with an outturned annular flange 26 at its outer end and is connected with the disk member 21 by having such outturned flange engaged and locked in the hollow peripheral bead 24 of the disk member. The rearwardly extending axial flange 25 is of a length such that when the cover 10 has been applied to the wheel 11, the inner end of this flange will extend somewhat beyond the internal annular projection 18 of the rim member 13 and will lie adjacent the concave internal annular recess 19.

The retaining elements 23 are located at circumferentially spaced points around the rearwardly extending flange 25, for example four such points, and project substantially radially therefrom for holding engagement in the internal annular recess 19 of the rim member 13. These retaining elements are carried by an annular wire ring 27, which is located substantially at the inner end of the axial flange 25 and is connected therewith by being disposed in a hollow annular bead 28 formed on such inner end of this flange. The axial flange 25 is interrupted at circumferentially spaced points by openings 29 therein which are disposed at locations corresponding with the circumferential spacing of the retaining elements 23, such that the latter project substantially radially from the axial flange through these openings as shown in Fig. 3.

In accordance with the present invention, the retaining elements 23 are preferably constructed as integral portions of the wire ring 27 which is made of a resilient wire such as piano wire. As here shown, the retaining elements 23 may each comprise a substantially M-shaped segment of the wire ring 27 extending in spanning relation across one of the openings 29 of the axial flange 25. These spanning portions of the wire ring 27 are deformed or bent to a wavy or sinuously curved shape, as seen in Fig. 3, such that the retaining elements 23 each comprise a pair of circumferentially spaced radially projecting convexly rounded locking elements or lugs 23ª and a concavely bowed connecting portion 23ᵇ extending between and connecting the convex lugs.

When the cover 10 is applied to the vehicle wheel 11, the rearwardly extending axial flange 25 is moved inwardly in telescoping relation within and is guided by the internal annular projection 18 of the rim member 13. During this movement, the convex lugs 23ª of the retaining elements 23 travel across or ride over the annular projection 18 and engage in the internal annular groove or recess 19 of the rim member. The resiliency of the exposed or spanning portions of the wire ring 27 permits a flexing of the retaining elements 23 while the cover is being applied to the wheel thereby enabling the convex lugs 23ª to be sprung or displaced inwardly in riding over the annular projection 18 and also causes these lugs to be moved or sprung outwardly into holding engagement in the internal anular recess 19 when the cover has been fully applied to the wheel.

In the fully applied position of the cover 10, the peripheral bead 24 is in seating engagement with the front flange 15 of the rim member 13 as shown in Fig. 2. The engagement of the convex lugs 23ª of the retaining elements 23 in the internal recess 19, will effectively hold the cover 10 in such fully applied position on the vehicle wheel but will still permit the cover to be readily removed from the wheel, when desired, by a prying force applied to the rim of the cover by a suitable tool.

In the construction above described for the improved wheel cover 10, it will be seen that the cover comprises a minimum number of parts and that the retaining elements 23 can all be preformed in properly spaced relation on the wire ring 27, such that when this ring is mounted on the axially extending flange 25 by being disposed in the hollow bead 28 thereof, the retaining elements will be located in the desired relation in which they project substantially radially from this flange through the circumferentially spaced openings 29 thereof.

Figs. 4 to 7 inclusive show a modified form of wheel cover 31 intended for use on a conventional vehicle wheel 32 which is here shown as being of the same construction as the wheel 11 described above. The cover 31 comprises, in general, a substantially circular disk member 33 and a ring member 34 connected with the disk member and defining a generally axially extending rear annular flange 35 of a diameter for guided telescoping movement within the internal annular projection or hump 36 of the rim member 37 of the wheel.

The disk member 33 is a substantially circular sheet metal member having any desired ornamental configuration stamped or otherwise formed thereon and also having an annular rim defined by a hollow peripheral bead 38. The disk member 33 is of a diameter such that when the cover has been applied to the wheel 32, the peripheral bead 38 will be located substantially opposite the front radial flange 39 of the rim member 37.

The ring member 34 comprises an annular sheet metal member having an outturned flange 40 at its outer end which is locked in the hollow peripheral bead 38 of the disk member 33 for connecting the ring member therewith. The axially extending annular flange 35 of this ring member is provided intermediate its ends with a radially inwardly offset annular portion 41 carrying a group of circumferentially spaced retaining elements 42, for example four such retaining elements, which are engageable in the internal annular groove or recess 43 of the rim member 37 for holding the cover 31 in its applied position on the vehicle wheel.

The retaining elements 42 are here shown as comprising deformed portions of a wire ring 44 similar to the retaining elements 23 above described. The wire ring 44 is made of resilient wire, such as piano wire, and is connected with the ring member 34 by being located in an annularly aligned series of hollow bead portions 45 formed on the intermediate portion of the annular flange 35.

The annular flange 35 is also provided with circumferentially spaced openings 46 located to correspond with the annular spacing of the retaining elements 42. The openings 46 are spanned by the bent portions of the wire ring 44 which define the retaining elements 42. As shown in Fig. 6, the retaining elements 42 project substantially radially from the axial flange 35 and have spaced convexly rounded lugs 42ª which project through the openings 46.

The ring member 34 is also provided, at the inner end of the axial flange 35, with seating means which is engageable with the rim member 37 and which is here shown as comprising a rearwardly and inwardly inclined annular flange or lip 47. This inclined flange 47 is an annularly continuous integral flange which spans all of the openings 46. When the cover 31 is applied to the vehicle wheel 32, the inclined flange 47 seats against the rearwardly and inwardly inclined annular side wall 48 of the drop-center portion 49 of the rim member 37. The axial flange 35 of the ring member 34 is of a length such that when the inclined flange 47 is seated against the drop-center portion 48, the peripheral rim 38 of the disk member 33 will be disposed in spaced relation to the front radial flange 39 of the rim member 37 to define therebetween an annularly extending radial air passage 50.

When the inclined flange 47 is in this seating engagement with the rim member 37, the retaining elements 42 will be engaged in the internal annular groove 43 for holding the cover in its applied position on the vehicle wheel. When the cover 31 is being applied to the wheel 32, the axial flange 35 has telescoping guiding engagement with the internal annular projection or hump 36 of the rim member 37, and the convex lugs 42ª of the retaining elements 42 ride over this internal projection and spring outwardly into the internal groove 43. The cover 31 can be removed from the wheel 32 by a prying force applied to the peripheral bead 38 by a suitable tool to cause the retaining elements 42 to be disengaged from the internal groove 43 and travel outwardly over the internal projection 36.

The ring member 34 of the cover 31 is also provided with a series of circumferentially spaced cooling fins 51 which are tranversed by air flowing through the annular air passage 50 and which also serve as blades for producing a flow of air through this passage during the rotation of the vehicle wheel 32. This flow of air through the passage 50 is desirable for cooling purposes, as for example, for cooling braking means embodied in the vehicle wheel. The fins 51 are formed by metal which has been deflected from the openings 46 of the flange 35 of the ring member 34. In this instance, the fins are shown as having been formed by metal deflected inwardly such that the fins extend in a substantially radial direction and remain connected at their outer ends with the axial flange 35. Since the fins 51 are formed by metal displaced from the openings 46, they correspond in number with these openings.

From the construction of the wheel cover 31, as shown in Figs. 4 to 7 inclusive and described in detail above, it will be seen that this cover, likewise, comprises a minimum number of connected parts and that when the wire ring 44, having the retaining elements 42 thereon, is connected with the ring member 34 by being located in the hollow bead portions 45, the retaining elements will be in their properly assembled position to project substantially radially from the axial flange 35 through the openings 46. Likewise, it will be seen that in the applied position of this cover, the engagement of the seat means 47 against the rim member 37 will hold the peripheral bead 38 of the cover in the above-explained spaced relation to the rim member to define the air passage 50 to accommodate a flow of cooling air across the fins 51.

Figure 8:
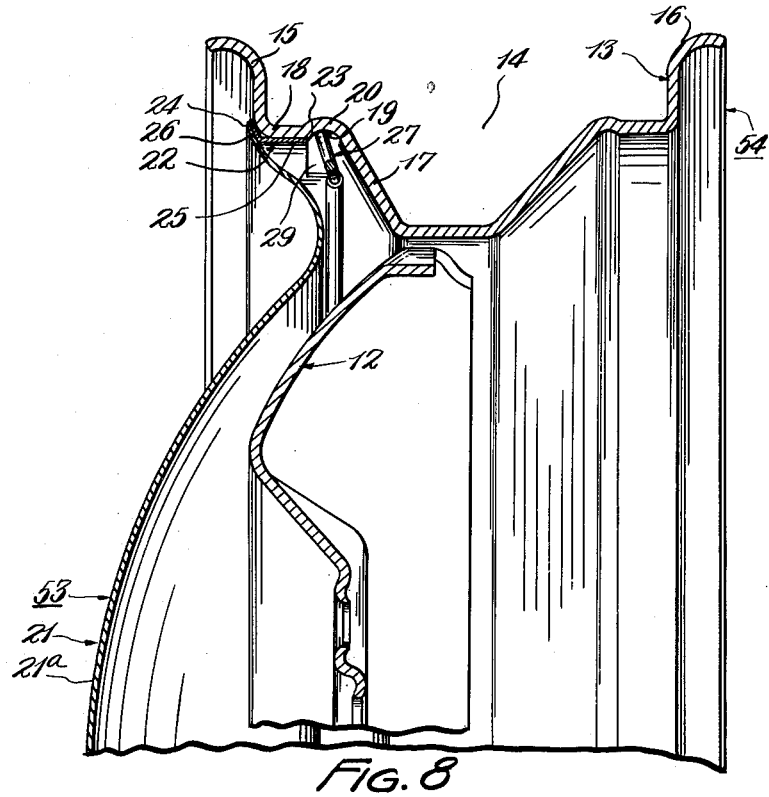
Fig. 8 is a partial vertical section similar to those of Figs. 2 and 5, but showing another modified form of wheel cover applied to a vehicle wheel.
Figure 9:
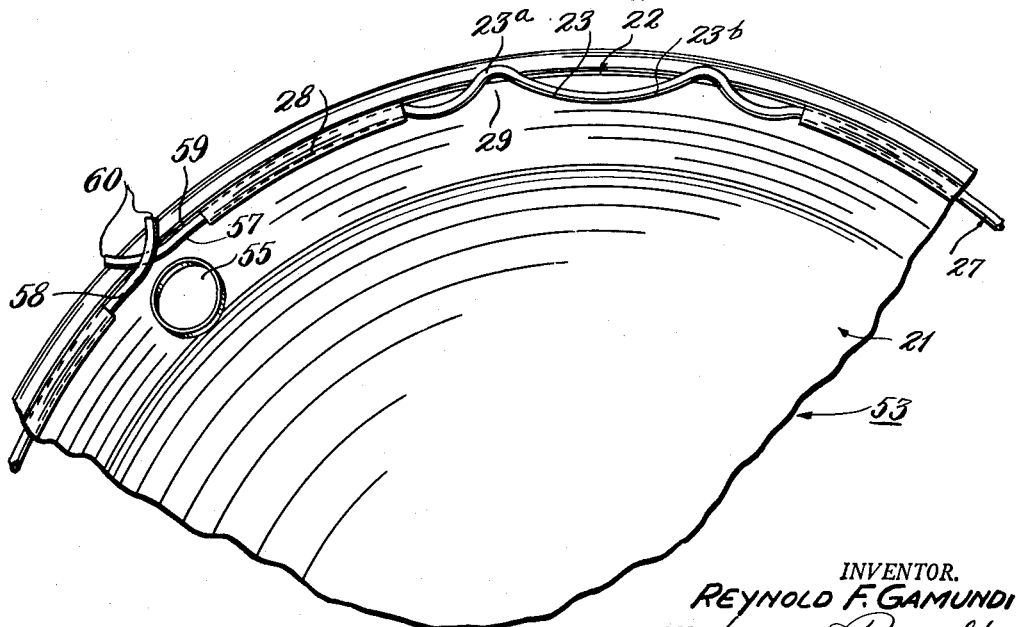
Fig. 9 is a partial rear elevation of the wheel cover of Fig. 8, but showing the same in detached relation.

Figs. 8 and 9 of the drawings show another modified form of wheel cover 53 applied to a vehicle wheel 54. The wheel cover 53 is of a construction similar to that of the wheel cover 10 and comprises the same corresponding parts to which the same reference characters have been applied. The vehicle wheel 54 is substantially identical with the vehicle wheel 11, and hence, the same reference characters have been applied to the same corresponding parts.

In the modified wheel cover 53, the disk member 21 is provided with an opening 55 adjacent the periphery thereof to accommodate the valve stem of the pneumatic tire to be mounted on the rim member 13. At a point adjacent the opening 55, the wire ring 27 has end portions 57 and 58 projecting from an interruption 59 in the bead 28. These end portions 57 and 58 form a pair of prongs 60 which are engageable with the rim member 13 for preventing relative rotation between the cover 53 and the vehicle wheel 54. It is desirable to prevent such relative rotation so that the fly wheel effect of the cover 53 will not damage the valve stem of the pneumatic tire.

As shown in Fig. 9, the prongs 60 are located adjacent the opening 55 so that these prongs can be engaged in the annular recess 19 of the rim member 13 at substantially the same time that the opening 55 is moved over the valve stem of the pneumatic tire. In applying the cover 53 to the wheel 54, the opening 55 is applied to the valve stem and the prongs 60 are engaged in the annular groove 19 as the first step, after which the other portions of the cover are advanced into the opening of the rim member for engaging the retaining elements 23 in the annular groove.

The end portions 57 and 58 of the wire ring 27 extend circumferentially and radially in an outwardly curving relation so that the extreme ends of these curved end portions form the prongs 60. These prongs present relatively sharp corners or edges which will bite into the metal of the rim member for forming an interlock between the cover and vehicle wheel which will prevent relative rotation therebetween. The end portions 57 and 58 extend in opposite directions circumferentially of the cover in a crossing relation, as shown in Fig. 9, such that the individual prongs 60 will be effective for preventing relative rotation during turning of the vehicle wheel in either direction.

The cover 53 is preferably provided with only a single pair of the prongs 60 located adjacent the valve stem opening 55, so as to facilitate the operation of applying the cover to the wheel as explained above. If desired, however, other pairs of such prongs could be provided at one or more other points around the periphery of the cover.

In the modified wheel cover 53, the wire ring 27 is also constructed with the retaining elements 23 disposed in a forwardly inclined relation, that is, inclined at a small angle toward the disk member 21, as shown in Fig. 8. The retaining elements 23 are inclined forwardly from the axis of the bead 28 and will provide a holding force of increased strength for retaining the cover 53 on the vehicle wheel 54. Because of this inclined relation of the retaining elements 23, any tendency for the cover to become disengaged from the wheel will tend to produce swinging of the retaining elements to a true radial position. The resiliency of the wire 27 will resist this swinging of the retaining elements with considerable force which will represent an increased holding force for retaining the cover in its applied position. When a prying force of sufficient magnitude is applied to the cover 53, the retaining elements 23 will, however, become disengaged from the rim member 13 by riding over the internal annular projection 18.

From the construction shown in Figs. 8 and 9 and described above for this modified form of wheel cover 53, it will be seen that this cover is also of a simple construction comprising a relatively small number of parts and can be quickly applied to or removed from a vehicle wheel. It will also be seen that this modified cover 53 embodies prong means adapted to cooperate with the rim member for preventing relative rotation between the cover and the wheel to which it has been applied. Additionally, it will be seen that the forwardly inclined relation for the resilient retaining elements also provides increased holding power for retaining the cover in its applied position on the wheel.

From the foregoing description and the accompanying drawings, it will be further understood that this invention provides wheel covers of a simplified construction which can be economically produced and which can be readily applied to the vehicle wheels and will be securely retained thereon, except when removal is desired, whereupon the covers can be readily disengaged from the wheels by a simple prying force.

Although the wheel covers of the present invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. A wheel trim device comprising, a substantially circular member having a generally axially rearwardly extending annular flange of a diameter for telescoping engagement with an internal annular surface of the tire rim of a vehicle wheel, means carried by said flange and defining retaining elements engageable with said annular surface for retaining the trim device in its applied position on the wheel, and other retaining means carried by said flange comprising radially-and-circumferentially inclined wire prong elements having exposed ends and said prong elements being resiliently expansive substantially radially of said flange to form an interlock with said tire rim for preventing relative rotation between the trim device and wheel.

2. A trim device as defined in claim 1 in which said circular member is provided with a tire valve stem opening and said prong elements are located on said flange at a point adjacent to and substantially radially opposite said opening.

3. A wheel cover comprising, a disk member having a generally axially rearwardly extending annular flange provided with openings at circumferentially spaced points therearound, a wire ring conneceted with and carried by said flange and having bent portions projecting from said openings and defining substantially radially extending resilient retaining elements, and prong elements projecting from said flange in radially and circumferentially inclined relation and formed by end portions of said wire ring.

4. A wheel cover comprising, a disk member having a generally axially rearwardly extending annular flange provided with openings at circumferentially spaced points therearound, bead means on said flange and extending annularly thereof, a wire ring connected with said flange by engagement in said bead means and having bent portions projecting from said openings and defining substantially radially extending resilient retaining elements, end portions of said wire ring defining prong elements projecting from said bead means.

5. A wheel cover comprising, a disk member having a generally axially rearwardly extending annular flange provided with openings at circumferentially spaced points therearound, a wire ring connected with and carried by said flange and having bent portions projecting from said openings and defining substantially radially extending resilient retaining elements, and prong elements projecting from said flange in radially and circumferentially extending oppositely inclined relation and formed by crossed end portions of said wire ring.

6. A wheel cover as defined in claim 5 in which said disk member has a tire valve stem opening therein and said prong elements are located adjacent said valve stem opening.

7. A wheel cover comprising, a disk member, a ring member connected with said disk member and defining a generally axially rearwardly extending annular flange having openings therein at circumferentially spaced points, hollow bead means formed on said flange at the inner end thereof, said disk member having a tire valve stem opening therein, a wire ring connected with said flange by being disposed in said hollow bead means, retaining elements defined by resilient bent portions of said wire ring and projecting from the openings of said flange, and prong elements projecting from said bead means in radially and circumferentially extending oppositely inclined relation and formed by crossed end portions of said wire ring.

8. A wheel cover comprising, a disk member, a ring member connected with said disk member and defining a generally axially rearwardly extending annular flange having openings therein at circumferentially spaced points, hollow bead means formed on said flange at the inner end thereof, said disk member having a tire valve stem opening therein, a wire ring connected with said flange by being disposed in said hollow bead means, and resilient retaining elements defined by bent portions of said wire ring and projecting generally radially from the openings of said flange, said retaining elements being inclined forwardly from said bead means.

9. A wheel cover for a vehicle wheel of the type having a tire bead receiving rim portion defining an internal annular projection and an internal anular groove axially inwardly of said annular projection, comprising a disk member, a ring member connected with said disk member and defining a generally axially rearwardly extending annular flange having openings therein at circumferentially spaced points, said flange being of a diameter and axial length to be telescopingly guided by and extend axially beyond said projection when the cover is applied to said wheel, hollow bead means formed on said flange at the inner end thereof, said disk member having a tire valve stem opening therein, a wire ring connected with said flange by being disposed in said hollow bead means, retaining elements defined by resilient bent portions of said wire ring and projecting from the openings of said flange, said retaining elements being movable over said projection when said cover is being applied to or removed from said wheel and in the fully applied position of said cover having locking engagement in said annular groove, and prong elements projecting from said bead means in radially and circumferentially extending oppositely inclined relation and formed by crossed end portions of said wire ring, said prong elements being engageable in said annular groove and effective to prevent relative rotation between said cover and wheel, said retaining elements being inclined forwardly from said bead means.

10. A wheel cover comprising, a disk member, a sheet metal ring member defining a generally axially extending annular flange having its outer end connected with said disk member and having a hollow annular bead adjacent its inner end, said bead having circumferentially elongated gaps therein, a wire ring connected with said flange by being disposed in said hollow bead and having circumferentially extending segments of wavy configuration exposed in said gaps and defining resiliently supported retaining elements projecting substantially radially from said flange, and prongs formed by other portions of said wire ring projecting in circumferentially inclined relation from said hollow bead.

11. A wheel cover comprising, a disk member, a ring member connected with said disk member and defining a generally axially rearwardly extending annular flange having hollow bead means at the inner end thereof, said flange having openings therein interrupting said hollow bead means at circumferentially spaced points, said disk member having a tire valve stem opening therein, and a wire ring connected with said flange by being disposed in said hollow bead means, and wire ring having circumferentially extending segments of wavy configuration exposed in the interruption of said bead means and defining groups of substantially radially projecting retaining elements, other portions of said wire ring projecting in circumferentially inclined relation from said hollow bead means and defining prong elements.

12. A wheel cover comprising, a sheet metal disk member, a sheet metal ring member defining a generally axially extending annular flange projecting from the inner side of said disk member and having its outer end connected with the latter, said flange having circumferentially elongated openings therein at circumferentially spaced points, and a wire ring carried by said flange and having circumferentially spaced and elongated substantially M-shaped resilient segments located in said openings, the portions of said segments corresponding with the top portions of the M-shape defining pairs of resiliently supported circumferentially spaced retaining elements of a convexly rounded contour projecting substantially radially from said flange.

13. A wheel cover comprising, a sheet metal disk member, a sheet metal ring member defining a generally axially extending annular flange projecting from the inner side of said disk member and having its outer end connected with the latter, said flange having hollow bead means thereon adjacent its inner end and also having circumferentially spaced and elongated openings interrupting said hollow bead means, and a wire ring carried by said flange and engaged in said hollow bead means, said wire ring having circumferentially spaced and elongated substantially M-shaped resilient segments located in and substantially spanning said openings, the portions of said segments corresponding with the top portions of the M-shape defining pairs of resiliently supported circumferentially spaced retaining elements of a convexly rounded contour projecting substantially radially from said flange.

14. A wheel cover for a vehicle wheel of the type having a tire bead receiving rim portion including a substantially cylindrical axial wall portion and a substantially radial internal annular groove at the inner end of said wall portion, comprising a disk member having a generally axially rearwardly extending annular flange of a diameter to have telescoping guiding engagement with said wall portion when the cover is applied to said wheel, said flange having circumferentially spaced and elongated openings therein, and a wire ring connected with and carried by said flange and having circumferentially spaced and elongated substantially M-shaped resilient segments located in said openings, the portions of said segments corresponding with the top portions of the M-shape defining pairs of resiliently supported circumferentially spaced retaining elements of a convexly rounded contour projecting substantially radially from said flange and adapted to be expansively and seatingly engaged in said annular groove.

15. A wheel cover for a vehicle wheel of the type having a tire bead receiving rim portion including a substantially cylindrical axial wall portion and a substantially radial internal annular groove at the inner end of said wall portion, comprising a disk member having a generally axially rearwardly extending annular flange of a diameter to have telescoping guiding engagement with said wall portion when the cover is applied to said wheel, openings therein, a wire ring carried by said flange, retaining members formed by portions of said wire ring and projecting from said flange at circumferentially spaced points and engageable in said groove, and prongs projecting from said flange and formed by other portions of said wire ring and engageable in said groove for resisting relative rotation between said cover and wheel.

16. A wheel cover for a vehicle wheel of the type having a tire bead receiving rim portion including a substantially cylindrical axial wall portion and a substantially radial internal annular groove at the inner end of said wall portion, comprising a disk member, a sheet metal ring member connected with said disk member and defining a generally axially extending annular flange having circumferentially spaced and elongated openings therein adjacent its inner end, a wire ring connected with said flange and having substantially M-shaped segments located in said openings and defining groups of resiliently supported convexly rounded retaining elements projecting substantially radially from said flange and adapted to be expansively and seatingly engaged in said annular groove, and prongs projecting from said flange and formed by other portions of said wire ring and engageable in said groove for resisting relative rotation between said cover and wheel.

References Cited in the file of this patent

UNITED STATES PATENTS

| | | |
|---|---|---|
| 1,817,194 | Hunt | Aug. 4, 1931 |
| 1,836,424 | Yanss | Dec. 15, 1931 |
| 2,607,632 | Lyon | Aug. 19, 1952 |
| 2,624,636 | Lyon | Jan. 6, 1953 |

FOREIGN PATENTS

| | | |
|---|---|---|
| 812,968 | France | May 21, 1937 |